No. 772,239.

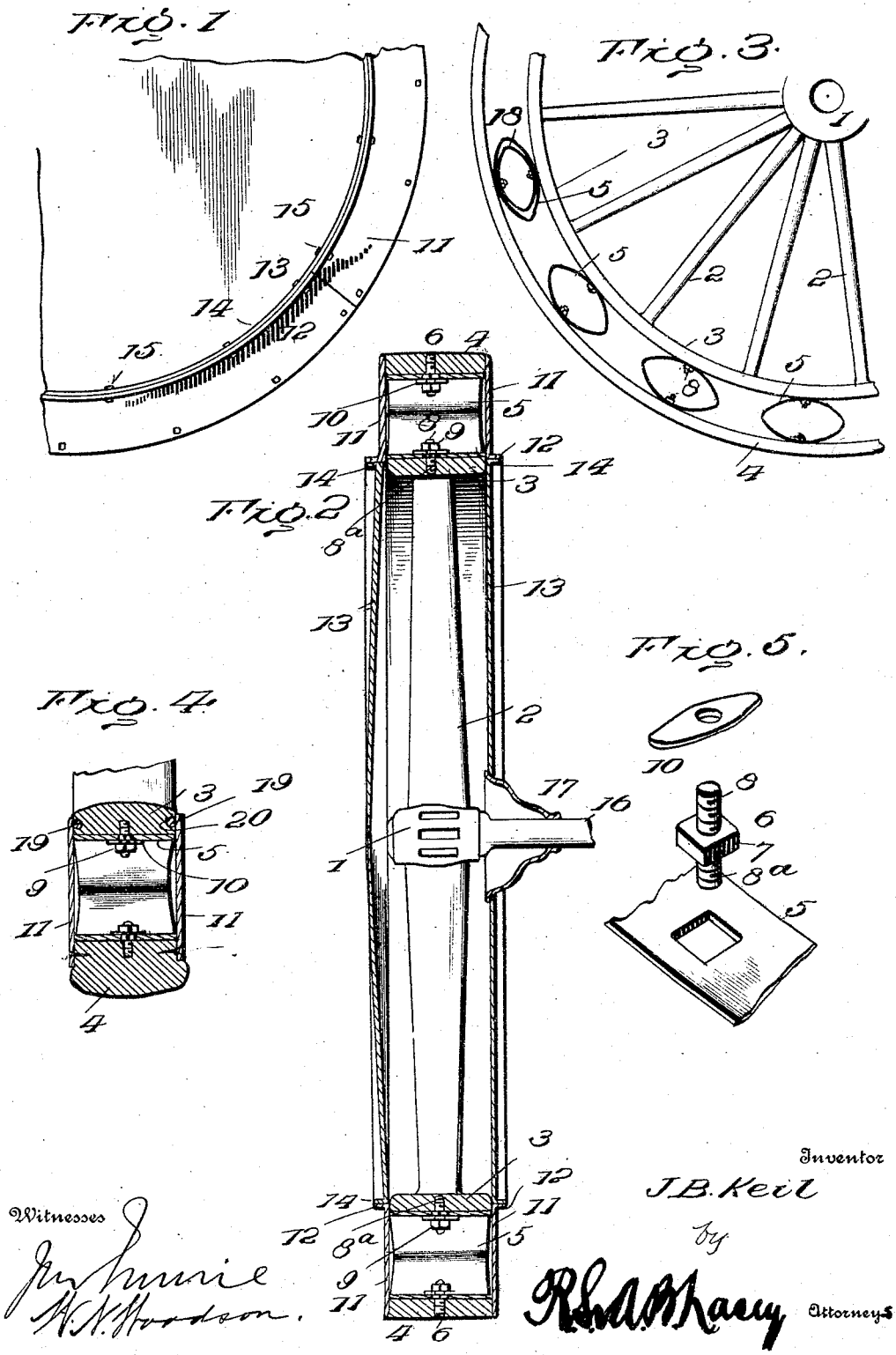

Patented October 11, 1904.

UNITED STATES PATENT OFFICE.

JOSEPH B. KEIL, OF MARION, OHIO.

SPRING-WHEEL.

SPECIFICATION forming part of Letters Patent No. 772,239, dated October 11, 1904.

Application filed March 26, 1904. Serial No. 200,153. (No model.)

*To all whom it may concern:*

Be it known that I, JOSEPH B. KEIL, a citizen of the United States, residing at Marion, in the county of Marion and State of Ohio, have invented certain new and useful Improvements in Spring-Wheels, of which the following is a specification.

This invention relates to improvements in spring-wheel structures of the type embodying a wheel having an inner rim and an outer tire, between which are interposed springs.

The object of the invention is to simplify the wheel structure generally, and special means are provided for mounting the springs in position and for guarding and housing said springs, so as to prevent any likelihood of foreign matter disturbing the proper and perfect operation of these parts.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a partial side elevation of a wheel emboying my invention. Fig. 2 is a vertical sectional view. Fig. 3 is a broken elevation of the wheel, the housing and guard-plates being removed. Fig. 4 is a vertical sectional view showing the construction of the wheel parts when adapted for use upon bicycles or vehicles of this class. Fig. 5 is a detail view bringing out more clearly the peculiar form of the securing means whereby the springs are held in position.

Corresponding and like parts are referred to in the following description and indicated in all the views of the drawings by the same reference characters.

Referring to the drawings, the wheel consists particularly of the hub 1, spokes 2, the inner rim 3, and the outer tire 4. The wheel as regards its general form is substantially the same as that in common use and is adapted to be mounted upon axles of any suitable type. Between the inner rim 3 and the tire 4 are interposed springs 5, which latter are of approximately elliptical form and which are utilized to take up vibration and jar to thereby give the necessary cushion effect which is prerequisite to the embodiment of a practical device of the class to which my invention relates. Peculiar securing means are utilized for attaching the springs 5, and the same consist of a securing member 6, provided with a squared shank portion 7 and having oppositely-extending threaded extensions 8 and $8^a$ projected therefrom. The extension 8 of each of the securing members 6 is adapted to be threaded into an opening provided in the inner rim 3. The squared shank portion or shoulder 7 is received in an approximately square opening provided in one side of one of the springs 5. A nut 9 is adapted to be screwed upon the threaded extension $8^a$, so as to firmly attach the adjacent side of the spring 5 to the inner rim. A transverse washer-plate 10 is preferably interposed between the nut 9 and the adjacent portion of the spring 5, and this plate 10 is elongated, so as to reinforce the securing means against strain caused by lateral stress of the springs 5 in turning movement of the wheel. The securing means for attaching each spring 5 to the inner rim 3 is the same as the means for attaching the said spring to the outer tire 4, as will be readily noted.

From the foregoing it will be seen that the outer tire 4, which is of course of larger diameter than the rim 3, is movable toward and from the rim and is thus adapted for no small amount of spring play in giving the necessary spring effect. In order to protect the springs from adverse conditions of service, and more especially to prevent entrance of foreign matter—such as dirt, water, (which might rust,) or the like—to the springs, spaced housing-plates 11 are utilized, being suitably secured at their outer portions to the tire 4. The housing-plates 11 are preferably made of aluminium or the like and are of annular form to correspond to the configuration of the wheel. The plates 11 extend from the tire 4 inwardly and adjacent to the rim 3, and thus form a virtual closure about the space between the said tire 4 and the rim 3. The inner portions of the housing-plates 11 are preferably provided with laterally-extending flanges 12, and guard-plates 13, inclosing the sides of the wheel, are also provided with flanges 14 similar to the flanges 12. Securing-fastenings 15 are adapted to be passed through the flanges 12 and 14 of the housing and guard plates to secure these members together.

With the above construction of the wheel it will be noted that the body of the said wheel is entirely housed and protected to great advantage in certain conditions of service.

In the use of the guard-plates 13 the outer of these plates may, if preferable, be of such form as to entirely close the outer side of the wheel, whereas the inner plate 13 is provided about centrally thereof with an opening through which the axle 16 passes. A flexible guard 17 is suitably secured to the inner guard-plate 13 at the opening before mentioned, and this guard preferably consists of a strip of canvas or analogous material extending entirely around the axle. It is necessary that this guard be flexible in order to permit the spring movement of the wheel relative to the tire 4.

It will be understood that the guard-plates 13 may be made in sections if this construction is deemed best suited for the purposes of the invention. Further, if desirable and usually for heavier vehicles an inner spring or inner springs 18 may be suitably secured within the outer spring 5.

When the invention is applied to bicycle-wheels wherein general lightness of structure combined with substantiality are necessary, the guard-plates 13 may be discarded and the housing-plates 11 only utilized. In the last-mentioned structure flexible strips 19 would be disposed in annular grooves 20 of the inner rim 3 and interposed between the said rim and the adjacent housing-plates 11. These strips would effectually exclude dust or dirt.

The peculiar form of the securing means whereby the springs are attached is specially advantageous in that the securing members interlock with the springs and the latter serve to a certain extent to prevent detachment of the said members from the rim or tire, as the case may be.

The springs 5 in assembling same and securing them in position are placed between the parts 3 and 4 after the securing members 6 have been attached to these parts. When the springs are placed in position, the square openings in the said springs receive the squared portions 7 of the securing members 6 to establish the interlocking connection hereinbefore premised upon. This having been done, the washer-plates 10 are then placed upon the threaded shanks 8, after which the nuts 9 are screwed hard against the washer-plates to hold the springs firmly in their places.

Having thus described the invention, what is claimed as new is—

1. The combination of a tire having an inner rim, an outer tire, springs disposed between the inner rim and the outer tire, housing-plates disposed upon opposite sides of the said rim and tire and inclosing the space therebetween, flanges projected from said housing-plates, and guard-plates secured to said flanges.

2. The combination of a wheel having an inner rim, an outer tire, springs disposed between the inner rim and the outer tire, housing-plates disposed upon opposite sides of the said rim and tire, and inclosing the space therebetween, and flanged guard-plates having their flanged portions secured to the flanges of the housing-plates aforesaid, said guard-plates embracing the opposite sides of the wheel.

3. The combination of a wheel having an inner rim, and outer tire, springs disposed between the said rim and tire, outer and inner guard-plates disposed upon opposite sides of the wheel, the inner guard-plate being provided with an opening to receive an axle, and a flexible guard connected with the inner guard-plate and embracing the axle.

In testimony whereof I affix my signature in presence of two witnesses.

JOSEPH B. KEIL. [L. S.]

Witnesses:
JOE NEIDHART,
NORA B. MARSH.